Dec. 7, 1965  H. I. HENDERSON  3,221,825
WELL DRILLING FLUID AND A METHOD OF USING SAME
Filed March 15, 1962  2 Sheets-Sheet 1
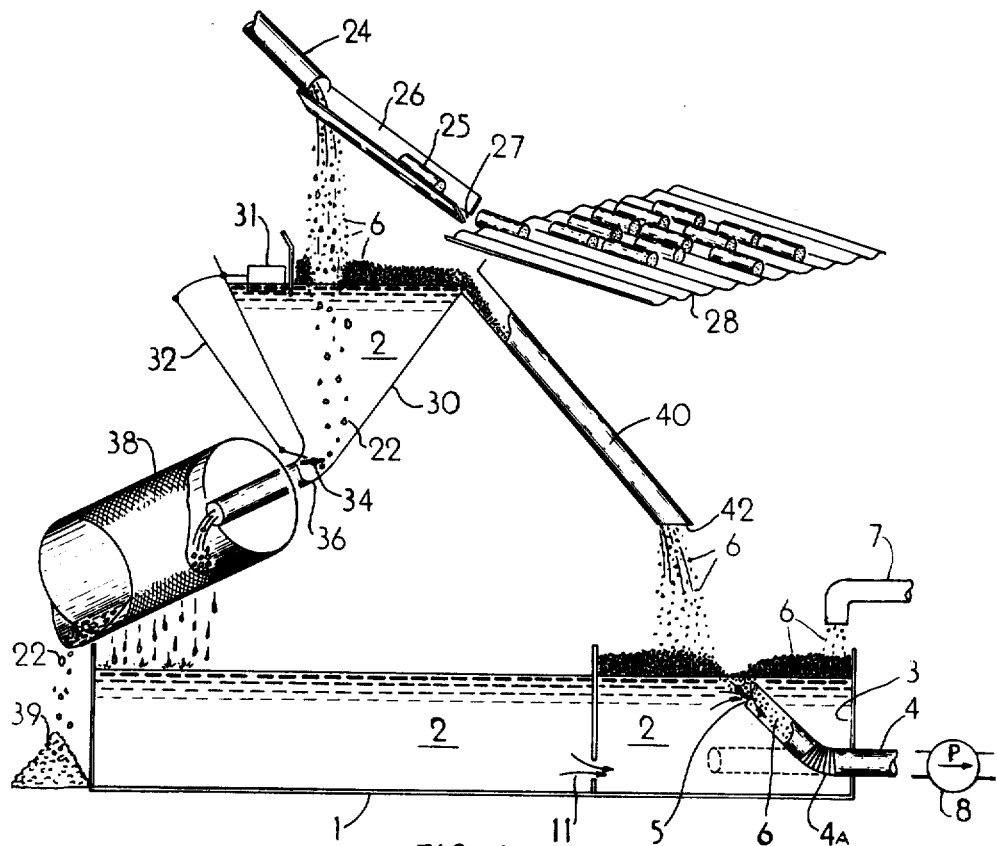
FIG. 1.
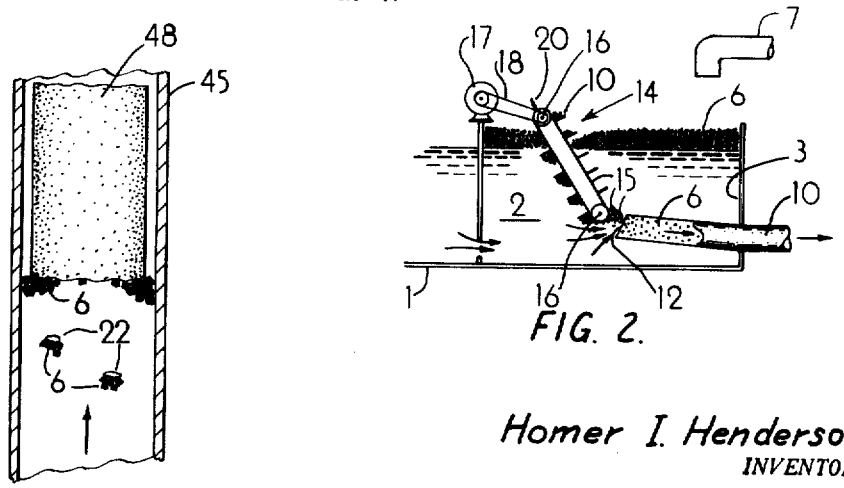
FIG. 7.
FIG. 2.
Homer I. Henderson
INVENTOR.

Dec. 7, 1965  H. I. HENDERSON  3,221,825
WELL DRILLING FLUID AND A METHOD OF USING SAME
Filed March 15, 1962  2 Sheets-Sheet 2

Homer I. Henderson
INVENTOR.

United States Patent Office 3,221,825
Patented Dec. 7, 1965

1

3,221,825
WELL DRILLING FLUID AND A METHOD
OF USING SAME
Homer I. Henderson, 2204 Live Oak, San Angelo, Tex.
Filed Mar. 15, 1962, Ser. No. 179,850
5 Claims. (Cl. 175—72)

This invention relates to a well-drilling fluid and the method of preparing same and, more particularly, to a well-drilling fluid particularly adapted to alleviate the effects of lost circulation.

During the past 50 years the great majority of oil wells and similar bore holes penetrated into the earth have been drilled with a rotary drill wherein a bit is attached to the lower end of a string of drill pipe sections and the bit rotated by rotation of the drill pipe at the surface. In the performance of rotary drilling, a drilling fluid is circulated downward from the surface of the earth through and around the drilling bit to cool the bit and is then returned to the surface of the well carrying bit cuttings to remove them from the bore hole. Various liquids, gases and combinations thereof have been used as drilling fluids but the drilling fluid most commonly used is called drilling mud comprising water which has been purposely weighted with dissolved or dispersed solids such as clays.

One of the major problems of such rotary drilling is termed lost circulation, i.e. the loss of drilling fluid to porous formations within the earth's crust, such as sands and porous limestones. Such formations are easily permeated by the drilling fluid, particularly when the pressure head of the drilling fluid exceeds that of the fluid within the pores of such formations and unless the pores or fissures are plugged and sealed off, a considerable quantity of the drilling fluid may be lost to the thief formation. The fluid pressures within such porous formations vary within wide limits as the geologic conditions change, but usually such pressures do not exceed that of the hydrostatic head of water. Consequently, drilling fluid including additives that are heavier than water is more susceptible to loss into such thief formations.

Others have experimented with the use of low density fluids such as air or other gases for the purpose of increasing the rate of drilling penetration. However, gas drilling cannot be practiced efficiently in many circumstances and aerated muds have been developed for that purpose. However, aerated muds have a number of objectionable characteristics including a tendency to corrode the drill pipe and an inability to scavenge drill bit cuttings efficiently. While such efforts to minimize the danger of lost circulation by use of low density fluids have not been completely successful, the practice of introducing lost circulation materials into the drilling liquid in order to plug up thief formations after lost circulation is experienced is a well known practice in rotary drilling. Experiments with various lost circulation materials are manifold and a wide diversity of materials have been used for that purpose, including mica, plastic, foil, hemp fibres and nut hulls. Such materials have enjoyed some success in plugging fissures, pores and other formation holidays. They have one major disadvantage in drilling fluids in that being heavier than water they increase the weight of the fluid and thus render it more susceptible to invasion of porous formations. Of course, there has been some use of materials which are lighter than water initially, such as wood fibres, but they soon become waterlogged by capillary action along the fibres and, hence, during most of the period of their use are heavier than water.

Not only do these lost circulation additives increase the weight of the drilling liquid, they clog up the filter or shaker screen by means of which the drill cuttings are separated from the fluid, often making it necessary to separate the cuttings by the slow process of gravitational settling in which process the lost circulation materials are also lost. A further significant disadvantage of these materials resides in the fact that they have a relatively low coefficient of friction when wet and a relatively low coefficient of compression and, as a consequence, they are easily dislodged from the channels or fissures of the thief formations upon reversal of the differential pressure.

It is, therefore, an object of this invention to provide a drilling fluid, the density of which is lower than that of water.

It is a further object of this invention to provide a drilling fluid adapted to plug the pores of thief formations in order to minimize loss of drilling fluid.

It is a further object of this invention to provide an additive for drilling fluids that has high coefficients of friction and compression which will grip fissure walls and expand when pressure is reduced to form a firmly lodged plug.

The drilling fluid of this invention includes a dispersant of particles of a material which is of low density, and has a high coefficient of compression and friction. An ideal material for this purpose is granulated cork. The cork may be introduced to the drilling fluid prior to circulation in the well by adding it to the surface of the drilling fluid in the storage reservoir and then pumping the fluid into the circulating system through a suction pipe intake opening which is located below the surface of the reservoir fluid. As the fluid is thus drawn off the cork is submerged to the level of the suction pipe intake to be circulated with the fluid. The cork may be thus submerged by the force of the suction pump or by auxiliary means, such as a mechanical conveyor. The cork particles readily flow with the circulating fluid into pores or fissures in the subsurface formation being penetrated, but the particles become lodged to build up a seal in the formation or, for that matter, within openings in the circulating system itself such as around the pipe joints and the circulating system seals. Since the cork has a high coefficient of friction and is highly compressible, it expands when no longer subjected to the circulating pump pressure and becomes tightly lodged to resist displacement when the differential pressure is in the opposite direction. Moreover, there are many physical characteristics of cork other than its high friction and compressibility that adapt it ideally for use as a lost circulation material. For one thing, its cellular structure made up of a number of impenetrable air cells makes it highly resistant to liquid penetration. Since it is not fibrous, liquids are not drawn through it by capillary action. Further, the high physical stability of cork permits it to retain its initial properties under a wide range of temperature, humidity and pressure conditions, and the chemical inertness of the cork permits it to be used safely in contact with many chemicals including petroleum products.

Other objects and advantages of this invention will become apparent from the description following when read in conjunction with the accompanying drawings wherein:

FIG. 1 is a schematic illustration of one form of apparatus for introducing low density particles into drilling fluid;

FIG. 2 is a partial schematic illustration of another form of apparatus for introducing low density particles into a drilling fluid;

FIG. 7 is a partial section view of a drill pipe illustrating the applicability of the lost circulation material of this invention to core drilling.

Figure 3:
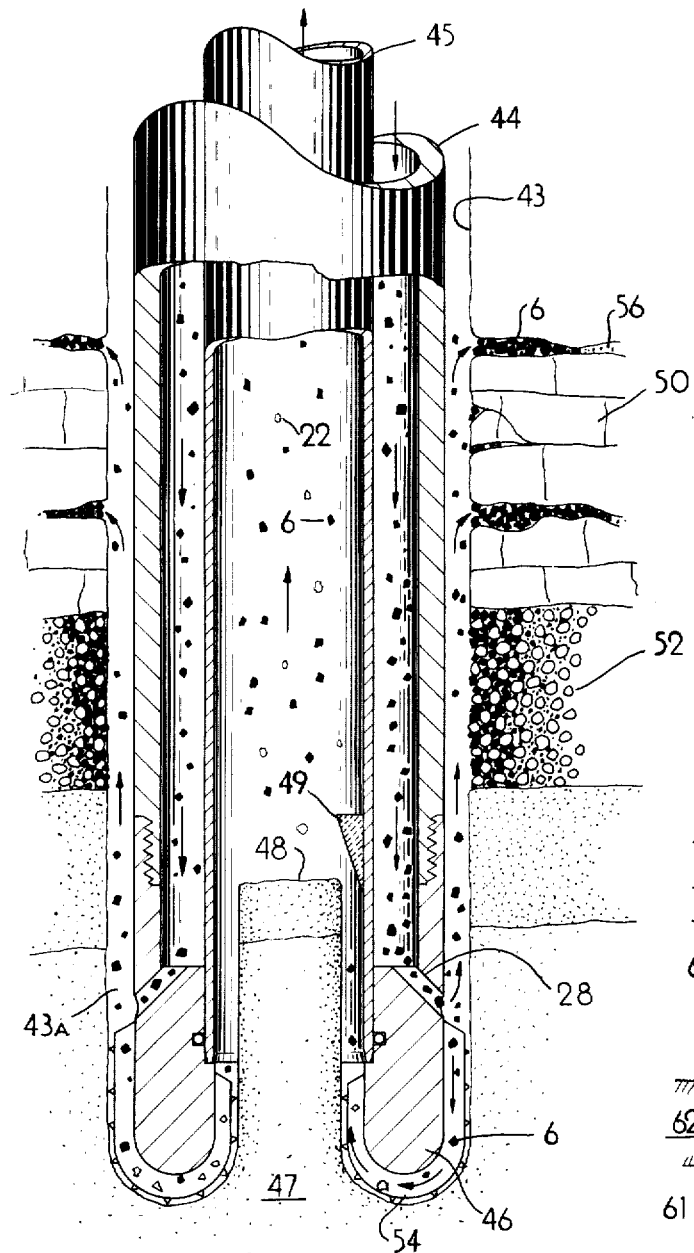
FIG. 3 is a partial section view of a drill bit and pipe string and a sub-surface formation penetrated thereby.

Referring now to FIG. 1 in greater detail, there is shown one form of apparatus for mixing a low density additive into the well circulating fluid. This apparatus is particularly adapted to place cork particles in suspension in the fluid, cork having many properties required for an ideal drilling fluid additive. It is a chemically inert and physically stable material of very low density and it has a high degree of resilience. Additionally, it is easily compressed by high pump pressure and pumped into the channels of porous thief formations. Once in place the cork will expand when pressure is reduced and plug the channels. Moreover, this plug resists displacement because of cork's unique high coefficient of friction when wetted, either with water or oil. There, a drilling mud reservoir 1 is shown schematically as a tank although it may comprise simply a pit excavated into the ground or any other suitable container for storage of the drilling fluid 2. In one portion of the reservoir 1 there is a suction compartment 3 into which is extended a suction pipe 4 including a flexible joint 4a that permits the intake terminal opening 5 of the suction pipe to be positioned at any desired level in the mud tank. It is highly desirable to prevent any air from entering the suction pipe and it is, therefore, necessary that the intake terminal 5 be placed below the surface of the fluid 2. However, if the intake terminal is placed near the surface of the mud as shown in FIG. 1, the formation of a drain hole vortex will suck the surface layers of the mud 2, and along with it any particles that may be floating thereon. Consequently when low density lost circulation materials, such as granulated cork 6, are to be circulated with the fluid they may, in the embodiment shown in FIG. 1, simply be placed on the surface of the fluid by any suitable feed means shown schematically at 7, and the intake terminal 5 of the suction pipe placed below the surface of the fluid but close enough that the suction of pump 8 will draw the cork into the suction pipe 4. The concentration of cork in the fluid dispersion medium may be controlled by the proximity to the surface of the suction pipe intake opening 5. Consequently, in the embodiment shown in FIG. 1, placement of the suction terminal opening 5 is a significant and critical feature of the apparatus.

Referring now to FIG. 2, there is shown the preferred embodiment of this invention wherein the cork particles 6 are introduced into the suction pipe 10 by artificial means which carry the particles down to the level of the intake opening 12 of the suction pipe 10. Thus, in order to avoid air entrapment the suction pipe 10 is placed deep enough in the drilling fluid or mud 2 within the reservoir 1 so that no drain hole vortex is formed and the cork particles are submerged to the level of the intake 12 by means of a conveyor 14 including a feed chain 15 carried over sprockets 16 and driven by a variable speed motor 17 through any drive transmission means such as a belt or sprocket chain 18. The shallow buckets 20 supported on the feed chain 15 are preferably formed from wire screening and carry particles of cork from the surface as shown down to the level of the intake opening 12 of the suction pipe which is placed as closely as possible to the lower sprocket 16 so that substantially all of the cork particles are removed from the bucket and carried into the suction pipe 10 for maximum removal efficiency. Thus, as each bucket 20 approaches the intake opening 12, the suction within the pipe 10 will remove the cork particles from the shallow buckets 20 and carry them through the suction pipe 10. The rate at which the cork particles are presented to the suction pipe intake 12 may be governed by controlling the speed of the motor 17 so that the driller may control the ratio of cork particles to fluid for a given pumping rate.

Referring again to FIG. 1, there is shown the apparatus for separation of cork particles and drill cuttings from the returning fluid emerging from the well prior to recirculation thereof. As there shown, the cork particles 6 and drill bit cuttings 22 are discharged from a return pipe 24 which, in the case of a core type drill will also bring up the core segments 25. If cores are to be returned, they may be separated by a core trough 26 which, as shown, has a narrow slot or opening 27 along the bottom thereof. The slot 27 is too narrow to pass the cores 24 but readily pass the drill cuttings 22 and the cork particles 6. The cores themselves are delivered at the end of the trough 26 to a core storage rack 28 of suitable design and the drilling fluid, the drill bit cuttings 22 and the cork particles 6 fall from the trough 26 into a decanting hopper 30. The liquid level in the hopper 30 is maintained substantially at a predetermined level by means of a float 31 which is connected by any suitable linkage 32 to a butterfly valve 34 at the discharge throat 36 of the decanting hopper 30. Thus, when the fluid level rises above the predetermined level the linkage opens the valve 34 and, when the fluid level falls the reverse action occurs. Desirably the lower portion of the valve disc 34 is cut away so that the valve does not interfere with the passage of cuttings and, in turn, the cuttings do not interfere with the operation of the valve. The relationship between the area of the throat 36 of the hopper and the rate of fluid flow is such that two-thirds of the throat area spanned by the valve 34 is sufficient for liquid level control. The fluid and cuttings discharge from the hopper 30 at the outlet 37 into a shaker screen which prevents passage of the cuttings separating them out of the fluid and removing them to a waste heap 39. The fluid is returned to the reservoir 1 for recirculation. Near the top of the hopper 30 there is provided a cork discharge tube 40 which draws off cork particles 6 accumulating on the surface of the liquid 2 within the hopper 30. The cork particles readily separate from the liquid as it falls from the trough 26 and further separation is realized in the low velocity area of the hopper 30 so that the cork particles rise to the surface. These cork particles accumulate on the surface of the liquid in the hopper 30 and when the accumulation of particles is high enough, they spill over into the cork discharge tube 40 as shown. The outlet 42 of the cork discharge tubes 40 is disposed to discharge the cork particles 6 into the suction compartment 3 of the mud tank 1 where they are supported on the surface of the mud tank 1 again to be fed into the suction pipe as previously described.

FIG. 3 shows the bit end of a core-type drill within a bore hole 43 wherein cork granules 6 are circulated with the drilling fluid. The drill pipe 44 includes a central core tube 45 concentrically secured within it and, at the lower end of the drill pipe 44 an annular bit 46 is secured thereto. The drilling fluid with cork particles 6 is circulated down to the annular space between the outer pipe 44 and the core tube 45, as indicated by the arrows and then into the bore-hole annulus 43a above the lower end of the bit, after which a portion of the fluid flows upwardly while the remainder flows down around the bit and up through the central core tube. As the annular bit 46 penetrates into the formation 47 a central core 48 is cut which may be severed from the formation by any suitable means such as a cam 49 to be carried to the top of the well with the circulating fluid.

Figure 4:
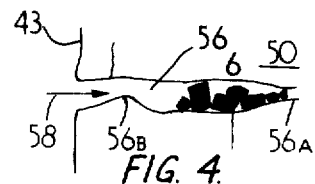
FIGS. 4 and 5 are partial section views of formation cavities with lost circulation material particles of this invention in place.
Figure 5:
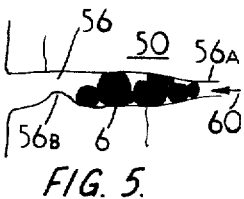

As shown in FIGS. 3, 4 and 5, when the drilling bit penetrates porous formations, such as the limestone thief formation indicated at 50 and the porous sand thief formation indicated at 52, the drilling fluid with the cork particles therein flows into the fissures or pores. However, the cork particles soon plug the formations so that there is no interruption to drilling and the loss of fluid is stopped. Thereafter, a much greater proportionate amount of the drilling fluid flows around the bit 46 and up through the core tube 45 to carry the cuttings 22 and cores 48 more efficiently. As shown more particularly in FIG. 4, when the drilling fluid flows into a channel or fissure 56 under the pressure of the pump plus the hydrostatic head, the total pressure being indicated by the long arrow 58, the compressed cork particles separate out of the liquid at a narrow constriction 56a and thereafter cork particles begin building up and, under the continuing pressure acting in the sense of the arrow 58, they are rammed tightly into the channel 56. In FIG. 5, the pump pressure has been removed, as well as some of the elevational head of the drilling fluid with the result that the bore hole pressure is less than the formation pressure, the differential pressure being reduced and reversed, as indicated by the short arrow 60 pointing toward the bore hole 43. The high pump pressure plus the elevation head together constitute a substantial pressure which is far greater than the formation pressure as indicated by the relative length of the arrows 58 and 60. Thus, when the cork particles 6 are no longer under the high pump pressure, the reduction in pressure causes them to expand proportionately. The expanded cork particles contact the walls of the channel 56 and because of cork's high coefficient of friction they are not easily dislodged by the relatively small differential pressure now operative. Other constrictions 56b in the channel 56 also aid in preventing the cork particles from becoming dislodged. Since with the particles expanded those which could pass the constriction in the compressed state can no longer do so. In order to form the most effective seals, it is preferable that the particles be of graduated size from the small dust particles to those just small enough to pass through the pump and bit orifices without danger of stoppages.

Figure 6:
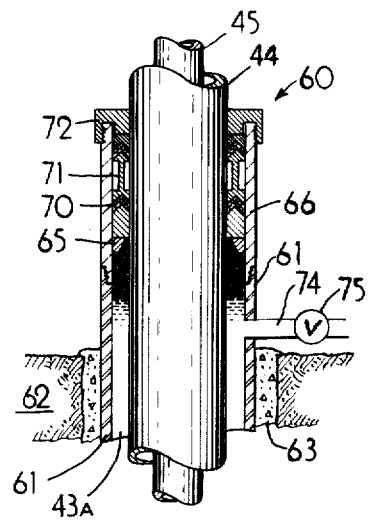
FIG. 6 is a partial section view of a well head pack-off seal with lost circulation materials of this invention employed as a supplemental seal.

In FIG. 6 there is shown a conventional drilling head pack-off 60 for sealing off the bore hole around the drill pipe 44. During the first stages of conventional drilling operations the surface casing 61 is secured and sealed to the earth's surface strata 62 by cement or the like 63 and the pack-off 60 is provided to contain the drilling fluid within the hole annulus 43a. The pack-off 60 may be a conventional packing as shown with a retaining ring 65 integral with the housing 66 which, in turn is threadedly connected to the casing 61. Desirably, the retaining ring 65 is tapered internally with the large internal diameter downward as shown. The packing itself may consist of packing rings 70, a lantern ring 71 and a packing gland 72, as shown in FIG. 6. Some distance below the pack-off housing 66 and communicating with the casing 61 is provided a lead-off pipe 74 carrying a valve 75. This drilling head pack-off arrangement is generally of conventional construction and, while widely used, presents a severe sealing problem for a number of reasons, not the least of which is the extensive axial as well as rotary movement of the drill pipe. Additionally, the surface of the drill pipe generally is not smooth but is covered with pits, scale and rust. Moreover, the drill pipe normally varies considerably in diameter and is often out of round. The sealing problem is further aggravated by the many small but sharp drill cuttings which are suspended in the drilling fluid and fed into the packing by the invading drilling mud. When the cork particles are used in the drilling fluid, they accumulate under this packing and act as a supplemental seal effectively to seal it against leakage. As individual cork particles are ground up by attrition, they move upward under the fluid pressure to be replaced by others. Desirably, a quantity of an oil-graphite mixture is floated on the liquid column within the casing 61 and above the lead-off pipe 74 to lubricate the drill pipe 44, the packing 60 and the cork 6 and also to prevent the chip-laden drilling fluid from invading the packing. The valve 75 in the lead-off pipe permits movement of fluid into or out of the hole annulus 43a without disturbing the oil-graphite mixture. If desired, the cork granules may be mixed with the oil-graphite mixture before placement and injected through the pipe 74. Also, a second retaining ring similar to ring 65 may be placed below the oil-graphite-cork mask to hold it in place for effective sealing particularly when drilling with gas.

Referring now to FIG. 7 there is shown schematically the manner in which the cork particles form a sort of raft under the cuttings 22 and the core 48. Because they are of different density, the drill cuttings and the core continue to fall relative to the ascending drilling fluid while the light cork particles continue to rise relative to the fluid. Consequently, between the cork and the cuttings and cores there is a substantial relative movement. The cuttings always fall with the flat side of greatest area normal to the line of fall and that side is well adapted to collect particles of cork which move upward relative thereto. The collection of cork particles on the large area surface tend to reduce the effective weight of the cutting and aid in transporting it to the surface, the surface tension of the liquid which wet the cork particles providing a force to hold the particles together in a raft-like agglomeration. With respect to the core 48, the cork particles not only provide a raft but tend to seal the radial clearance between the core 48 and the core tube 45 to convert the core in effect into a substantially sealed free piston so that the full pressure of the ascending fluid is available to transport it to the earth's surface.

It is apparent that other modifications and changes in this invention may be made by those skilled in the art without departing from the spirit and scope of this invention which is defined by the claims appended hereto.

What is claimed as invention is:

1. The method of preventing fluid loss in a rotary well drilling system including a string of drill pipe extending into the well through a drilling head pack-off at the surface which seals the space between the drill pipe and the hole annulus, comprising the steps of floating particles of cork in the drilling fluid, circulating said drilling fluid through said drilling system to enable said cork particles to be separated therefrom at constrictions in the leakage points in the system and permitting the cork particles to build up as a supplemental seal.

2. The method of preventing fluid loss in a well drilling circulating system which includes a string of drill pipe and a bore hole being drilled, said method comprising the steps of:
 providing a supply of drilling fluid,
 adding a quantity of cork particles to said drilling fluid, and
 introducing the drilling fluid with cork particle additives into the drilling circulating system and causing it to flow through fissures and leakage openings in said system whereby cork particles are separated from said fluid to build up as seals in said fissures and leakage openings.

3. The method defined by claim 2 including the further step of:
 adding quantities of cork particles to replace particles so separated at fissures and leakage openings.

4. In the process of well drilling, including the use of a drilling fluid circulating system, the improvement comprising the steps of:
 providing a supply of fluid,
 adding a quantity of cork particles to said fluid, and
 introducing the fluid with cork particle additives into the drilling fluid circulating system.

5. The process defined by claim 4 including the step of:
 dispersing said cork particles throughout said fluid prior to introducing it into the fluid circulating system.

(References on following page)

References Cited by the Examiner

UNITED STATES PATENTS

| | | | |
|---|---|---|---|
| 475,319 | 5/1892 | Jarvis | 175—65 |
| 2,227,533 | 1/1941 | Cooke | 260—742 |
| 2,342,588 | 2/1944 | Larkin | 175—72 |
| 2,345,009 | 3/1944 | Schuh | 260—742 |
| 2,398,347 | 4/1946 | Anderson | 166—31 |
| 2,832,566 | 4/1958 | Bielstein | 175—65 |
| 2,846,390 | 8/1958 | Lummus et al. | 175—72 |
| 3,034,984 | 5/1962 | Weiss | 252—8.5 |
| 3,086,937 | 4/1963 | Fischer | 252—8.5 |

CHARLES E. O'CONNELL, *Primary Examiner.*

BENJAMIN HERSH, *Examiner.*